US008673447B2

(12) United States Patent
Catalfamo

(10) Patent No.: US 8,673,447 B2
(45) Date of Patent: Mar. 18, 2014

(54) WATER-SOLUBLE SUBSTRATE WITH RESISTANCE TO DISSOLUTION PRIOR TO BEING IMMERSED IN WATER

(75) Inventor: Vincenzo Catalfamo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1283 days.

(21) Appl. No.: 11/824,631

(22) Filed: Jul. 2, 2007

(65) Prior Publication Data

US 2008/0008889 A1 Jan. 10, 2008

Related U.S. Application Data

(60) Provisional application No. 60/818,690, filed on Jul. 5, 2006.

(51) Int. Cl.
*B32B 5/16* (2006.01)
*B32B 17/10* (2006.01)
*B32B 7/04* (2006.01)

(52) U.S. Cl.
USPC ......... 428/411.1; 428/323; 428/327; 428/339

(58) Field of Classification Search
USPC ............... 428/341, 339, 327, 324, 421, 411.1
See application file for complete search history.

(56) References Cited

U.S. PATENT DOCUMENTS

| | | | | |
|---|---|---|---|---|
| 2003/0008085 | A1 * | 1/2003 | Davenet et al. | 428/35.4 |
| 2004/0186035 | A1 * | 9/2004 | Johnston et al. | 510/296 |
| 2004/0241348 | A1 * | 12/2004 | Koga et al. | 428/32.1 |
| 2005/0048234 | A1 * | 3/2005 | Duffield | 428/35.7 |
| 2005/0065051 | A1 * | 3/2005 | Catlin et al. | 510/220 |
| 2008/0108748 | A1 * | 5/2008 | Buckley et al. | 524/612 |

FOREIGN PATENT DOCUMENTS

| | | | |
|---|---|---|---|
| JP | 2001162708 | * | 6/2001 |
| WO | WO03076513 | * | 9/2003 |

OTHER PUBLICATIONS

Richard Lewis, Sr. Hawley's condensed chemical dictionary, 13th edition (1997).*
Machine Translation of JP 2001-162708 (2001).*

* cited by examiner

*Primary Examiner* — Callie Shosho
*Assistant Examiner* — Samir Shah
(74) *Attorney, Agent, or Firm* — Abbey A. Lopez

(57) ABSTRACT

A water-soluble substrate, and more particularly a water-soluble substrate that is resistant to contact with small amounts of water, and methods of making the same are disclosed. The water-soluble substrate comprises a first surface and a second surface. At least two coating layers are applied to at least one of said first and second surfaces, wherein said at least two coating layers substantially cover said at least one of said first and second surfaces, and wherein a lubricant is applied between said at least two coating layers. Articles, such as pouches, made from the water-soluble substrate, are also disclosed herein.

8 Claims, 2 Drawing Sheets

WATER-SOLUBLE SUBSTRATE WITH RESISTANCE TO DISSOLUTION PRIOR TO BEING IMMERSED IN WATER

CROSS REFERENCE TO RELATED APPLICATION

This application claims the benefit of U.S. Provisional Application Ser. No. 60/818,690, filed Jul. 5, 2006, the disclosure of which is incorporated by reference.

FIELD OF THE INVENTION

This invention relates to a water-soluble substrate, and more particularly a water-soluble substrate which has improved resistance to dissolution prior to being immersed in water, and methods of making the same. This invention also relates to articles, such as pouches, made from the water-soluble substrate.

BACKGROUND OF THE INVENTION

Water-soluble substrates are gaining wider acceptance for use as packaging materials. Packaging materials include films, sheets, blown or molded hollow bodies (i.e. sachets, pouches, and tablets), bottles, receptacles and the like. Often, water-soluble substrates, when used in the preparation of certain types of these articles such as sachets and pouches, disintegrate and/or become sticky when exposed to small amounts of water or high humidity. This can make them unsuitable for usage in the packaging and storage of the compositions contained therein.

The most common consumer complaint for water-soluble pouches is linked to unwanted pouch dissolution when accidentally exposed to small amounts of water, such as when water gets inside the outer packaging in which the pouches are sold and stored after purchase, from wet hands, high humidity, leaking sinks, or pipes during storage. This may cause the water-soluble pouches to leak prior to use and/or stick together. The second most frequent complaint is that of the water-soluble pouch failing to fully dissolve upon use. Thus, there remains an unmet need for water-soluble substrates and articles made therefrom, such as sachets and pouches, which have improved resistance to dissolution against exposure to small amounts of water yet can subsequently dissolve very quickly when immersed in an aqueous solution, such as rinse and/or wash water. Various methods are known in the art to retard the dissolution of water-soluble substrates, typically involving coating the water-soluble substrate with a material which is water-insoluble. For example, U.S. Pat. No. 6,509,072 describes a water-soluble substrate comprising a barrier coating. The barrier coating is a polymeric film which forms a continuous film on the water-soluble substrate. Another example of a barrier coating is described in WO 01/23460, assigned to Kao Corporation, wherein a surface of the water-soluble substrate is coated with a particulate or fibrous water-insoluble material.

When these coated water-soluble substrates are processed for use as packaging materials, they are typically being stretched. In certain areas, the substrate may be stretched even up to 200% or more. This could cause the coating to break, and thus allow water to contact the surface of the water-soluble substrate, leading to the above mentioned problems.

It is therefore an aspect of the present invention to provide water-soluble substrates which have improved resistance to dissolution prior to being immersed in water, even when these substrates have been stretched and formed into articles such as pouches and sachets, yet can subsequently dissolve very quickly when immersed in an aqueous solution, such as rinse and/or wash water.

SUMMARY OF THE INVENTION

The present invention relates to a water-soluble substrate comprising a first surface and a second surface opposite to said first surface, having at least two coating layers applied to at least one of said first and second surfaces. The coating layers are less water-soluble than the water-soluble substrate. The two coating layers substantially cover at least one of said first and second surfaces, and a lubricant is applied between the two layers.

The present invention also relates to an articles comprising the water-soluble substrate, and to a method of making the water-soluble substrate.

DETAILED DESCRIPTION OF THE INVENTION

This invention relates to a water-soluble substrate, and more particularly a water-soluble substrate which has improved resistance to dissolution prior to being immersed in water, and methods of making the same. This invention also relates to articles comprising the water-soluble substrate described herein.

Water-Soluble Substrate

Figure 1:
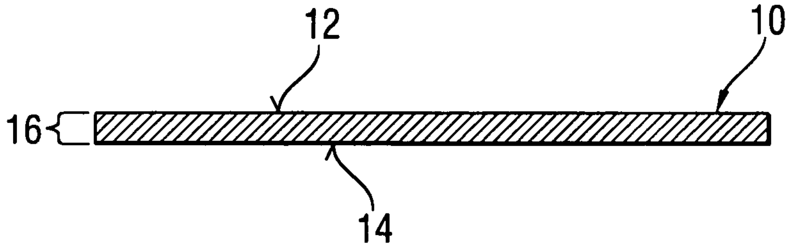
FIG. 1 shows a cross-section of a non-coated water-soluble substrate.

FIG. 1 shows a cross-section of a water-soluble substrate 10. The water-soluble substrate 10 has a first surface 12, a second surface 14 opposite to the first surface 12. The thickness 16 of the water-soluble substrate 10 between the first surface 12 and the second surface 14 can range from about 0.75 micrometer to about 1,250 micrometer, preferably from about 10 micrometer to about 250 micrometer, more preferably from about 25 micrometer to about 125 micrometer. The water-soluble substrate 10 can be in the form of a film, a sheet, or a foam, and includes woven and nonwoven structures.

The water-soluble substrate is made of polymeric materials and has a water-solubility of at least 50 weight %, as measured by the method set out here after using a glass-filter with a maximum pore size of 20 microns. Preferably the water-solubility of the substrate is at least 75 weight % or even more preferably at least 95 weight %.

50 grams±0.1 gram of substrate material is added in a pre-weighed 400 ml beaker and 245 ml±1 ml of 25° C. distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved fraction). Then, the % solubility can be calculated.

Typically the water-soluble substrate 10 has a basis weight of from 0.33 to 1.667 grams per square meter, preferably from 33 to 167 grams per square meter. The thickness of the water-soluble substrate 10 between the first surface 12 and the second surface 14 can range from about 0.75 micrometer to about 1,250 micrometer, preferably from about 10 micrometer to about 250 micrometer, more preferably from about 25 micrometer to about 125 micrometer.

Preferred polymers, copolymers or derivatives thereof suitable for use as substrate material are selected from polyvinyl alcohol (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohol copolymers, hydroxypropyl methyl cellulose (HPMC), and mixtures thereof. The most preferred polymer is polyvinyl alcohol. Preferably, the level of polymer in the substrate is at least 60%.

An example of commercially available water-soluble films are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

Coating Layers

Figure 2:
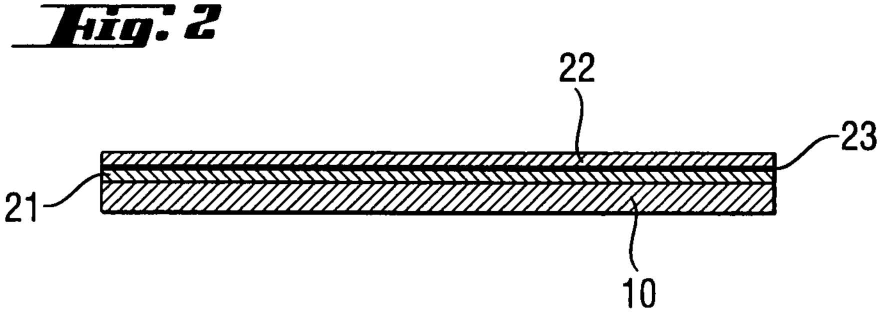
FIG. 2 shows a cross-section of one embodiment of a water-soluble substrate according to the present invention.

As shown in FIG. 2, at least two coating layers 21, 22 which are less water-soluble than said water-soluble substrate 10 (further referred to as the "coating layer") are applied to at least one of the first or second surfaces 12, 14 of the water-soluble substrate 10. A first coating layer is applied to at least one of the first or second surfaces 12, 14 of the water-soluble substrate 10. A second coating layer is applied on top of said first coating layer. Additional coating layers which are less water-soluble than said water-soluble substrate 10 may be applied on top of the previous two layers. Each of said coating layers may substantially cover the at least one of said first or second surfaces 12, 14. However, it is preferred that each of said coating layers covers only a portion or portions of said at least one of said first or second surfaces 12, 14, as long as all coating layers combined substantially cover said first or second surface 12, 14. With "substantially covers", it is meant that at least 95%, preferably at least 99%, and most preferably 100% of the first or second surface 12, 14 is covered by all layers of less water-soluble material. This ensures that upon accidental water-contact, the water will either not be able to reach the first or second surface 12, 14 of the water-soluble substrate 10, or the amount of water that reaches said surface, is not enough to completely solubilise the water-soluble substrate 10.

A lubricant 23 is applied between the coating layers. When the water-soluble substrate 10, with the coating layers 21, 22 applied to at least one of its surfaces 12, 14, undergoes stretching, the lubricant 23 ensures that the at least two, and optional additional, coating layers can glide over one another. This has a number of advantages. When the substrate is being stretched, the portions of the surface which are not covered by the first coating layer 21 are enlarged. As the second or optional additional coating layers are covering these portions, as explained above, it is ensured that accidental water droplets will still not be able to reach the surface of the water-soluble substrate. Secondly, although each and every coating layer could possibly break due to the stretching, the fact that multiple overlapping layers are applied, further reduces the risk that water could reach the surface of the water-soluble substrate.

Preferred lubricants include, but are not limited thereto, talc, polytetrafluoroethylene (PTFE), cornstarch, silicone, wax, oil, polyolefins such as polyethylene, polypropylene, or combinations thereof. Also suitable as lubricants are compounds typically used to provide lubrication and anti-sticky properties in rubber or plastic gloves, in compact foundation and make-up.

All coating layers can be identical in composition, or alternatively, they can be different. For example, the first coating layer which is closest to the surface of the water-soluble substrate may have the highest resistance against dissolution, while the other coating layers may be less resistant against dissolution. In another example, the first coating layer may have the least resistance against dissolution, while the other coating layers may be more resistant against dissolution. Also a gradient of resistance against dissolution across layers could be created, wherein the resistance against dissolution reduces or increases from the first to the last layer.

The total amount of coating layers can be at least 0.1 parts, per 100 parts by weight of the water-soluble substrate 10. Preferably, the less water-soluble material is applied in an amount of at least 1 part, more preferably at least 10 parts, per 100 parts by weight of the water-soluble substrate. Preferably, the amount of coating applied to said water-soluble substrate 10 ranges from 0.1 to 200, more preferably from 1 to 150, even more preferably from 10 to 100, even more preferably from 100 to 150 parts, per 100 parts by weight of the water-soluble substrate 10.

The coating layers can comprise a variety of materials, and can be applied in a variety of forms and methods, which will now be explained.

In one preferred embodiment, one or more of the coating layers may comprise polyvinyl alcohol having a high hydrolysis degree. The hydrolysis degree of the polyvinyl alcohol used for the coating is preferably greater than 97%. The composition can be comprised substantially entirely of polyvinyl alcohol, or it can be a mixture of polyvinyl alcohol with other suitable water-soluble or water dispersible materials, as described above.

In another preferred embodiment, one or more coating layers may comprise a material which is water-insoluble. With "water-insoluble material", it is meant that the solubility is less than 50 weight %, as measured according to the previously described method. Preferably, the water-solubility is less than 40 weight %, more preferably less than 30 weight %, and most preferably less than 10 weight %. The water-insoluble material may be a water-insoluble inorganic material or a water-insoluble organic material.

The water-insoluble inorganic material may be zeolite, bentonite, talc, mica, kaolin, sepiolite, silica, calcium carbonate, titanium oxide, anhydrous silicic acid, hydroxy calcium apatite, phthalocyanine blue, Helindone Pink, Hansa Orange, pearlescent material, etc., while zeolite, bentonite, talc, mica, kaolin, silica, titanium oxide, silicone, etc. are preferred.

The water-insoluble organic material may be a synthetic polymer such as polyethylene, polypropylene, polyamide, polyethylene terephthalate, polystyrene, polyurethane and/or its cross-linked product, sodium poly(meth)acrylic acid, poly (meth)acrylic acid ester and/or its cross-linked product, rubber such as ethylene rubber, propylene rubber, styrene-butadiene rubber, butadiene rubber, silicone rubber, etc. and/or its cross-linked products, etc.; or a natural polymer such as cellulose and/or its derivatives, starch and/or their derivatives, seed hulls, and/or their derivatives, while cellulose and/or its derivatives, starch and/or their derivative are preferred. Here, poly(meth)acrylic acid means both polyacrylic acid and polymethacrylic acid.

One or more coating layers may also be in the form of particles. Preferred particles are polymeric particles including particles made of synthetic materials as described above. Also preferably, these particles have an average diameter of 500 micrometers or less, more preferably 300 micrometers or less, even more preferably from 0.01 to 300 micrometers. In a highly preferred embodiment, the particles are in the nano-size-range, with average particle diameters of from 0.01 to 1 micrometer. Coating the water-soluble substrate 10 with nano-sized particles further provides the benefit that the coating becomes transparent, which is aesthetically preferred. Suitable nanoparticles 24 are polyethylene-, polypropylene-, wax-, silicone- or polytetrafluoroethylene-based nanoparticles.

In another highly preferred embodiment, one or more the coating layers may comprise a flexible material. Preferably, the coating layer comprising a flexible material can be elongated at least 20%, more preferably at least 30%, even more preferably at least 50%, most preferably more than 100% and up to 200%, without breaking. Examples of such flexible materials are liquid polyurethane coatings sold by Ideal Products LLC (Plymouth, Ind.) under the tradename of Sani-Tred Permaflex™, or by HMG America LLC (Performance Coatings, Roebuck, S.C.) under the tradename Flexithane™. Other examples of flexible coatings are the acrylic-based dip coatings which are flexible at low temperatures, sold by JC Whitney Inc. (Chicago, Ill.). A mixture of these coatings with any of the previously described coatings may also be used.

The coatings according to the present invention can be opaque, but are preferably transparent or translucent. Alternatively, they may be colored or three-dimensional in order to create appealing effects such as tactile (touch) effects or visual effects, such as graphics, cartoons, logo's, branding, user's instructions, and the like.

When the water-soluble substrate according to the present invention is however immersed in water (i.e. in applications for which the substrate is designed to be used and required to dissolve), the coating is not sufficient to resist the water contact and ensures that the substrate dissolves rapidly.

Optional Ingredients

It may be required for certain applications that the dissolution rate (when immersed) of the substrate is increased. Disintegrants may be added to one, several or all coating layers, in order to speed up the dissolution when the water-soluble substrate is immersed in water. Where present, the level of disintegrant in the coating is from 0.1 to 30%, preferably from 1 to 15%, by weight of said coating (all layers combined). Alternatively, disintegrants may also be applied on the surface of the water-soluble substrate 10, opposite to the surface onto which the coating layers are applied, or they may be applied onto both surfaces of the water-soluble substrate 10, or they may be integrated into the water-soluble film 10, or any combination thereof. Suitable disintegrants for use herein are corn/potato starch, methyl cellulose/celluloses, mineral clay powders, croscarmelose (cross-linked cellulose), crospovidine (cross-linked polymer), sodium starch glycolate (cross-linked starch).

The water-soluble substrate-forming composition and the water-soluble substrate 10 formed there from can also comprise one or more additive or adjunct ingredients. For example, the water-soluble substrate-forming composition and the water-soluble substrate 10 may contain: plasticizers, lubricants, release agents, fillers, extenders, anti-blocking agents, de-tackifying agents, antifoams, or other functional ingredients. The latter may, in the case of articles containing compositions for washing, include, but are not limited to functional detergent additives to be delivered to the wash water, for example organic polymeric dispersants, or other detergent additives.

Suitable plasticizers include, but are not limited to: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof. The plasticizer can be incorporated in the water-soluble substrate 10 in any suitable amount including amounts in the range of from about 5% to about 30% by weight, preferably in the range of from about 12% to about 20% by weight.

Suitable surfactants may include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). The surfactant can be incorporated in the water-soluble substrate 10 in any suitable amount including amounts in the range of from about 0.01% to about 1% by weight, preferably in the range of from about 0.1% to about 0.6% by weight.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble substrate 10 in any suitable amount including amounts within the range of from about 0.02% to about 1.5% by weight, preferably in the range of from about 0.04% to about 0.15% by weight.

Suitable fillers, extenders, antiblocking agents, detackifying agents include, but are not limited to: starches, modified starches, crosslinked polyvinylpyrrolidone, crosslinked cellulose, microcrystalline cellulose, silica, metallic oxides, calcium carbonate, talc and mica. The filler, extender, antiblocking agent, detackifying agent can be present in the water-soluble substrate 10 in any suitable amount including amounts in the range of from about 0.1% to about 25% by weight, preferably in the range of from about 1% to about 15% by weight. In the absence of starch, it may be desirable for the filler, extender, antiblocking agent, detackifying agent to be present in a range of from about 1% to about 5% by weight.

Suitable antifoams include, but are not limited to, those based on polydimethylsiloxanes and hydrocarbon blends. The antifoam can be present in the water-soluble substrate 10 in any suitable amount including amounts in the range of from about 0.001% to about 0.5%, preferably in the range of from about 0.01% to about 0.1% by weight.

The water-soluble substrate-forming composition is prepared by mixing the materials and agitating the mixture while raising the temperature from about 70° F. (about 21° C.) to 195° F. (about 90° C.) until solution is complete. The substrate-forming composition may be made into any suitable form (e.g. film or sheets) and may then be subsequently formed into any suitable product (e.g. single- and multiple-compartment pouches, sachets, bags, etc.).

Methods of Making a Water-Soluble Substrate

There are numerous non-limiting embodiments of the method of making the water-soluble substrate 10 described herein.

In one embodiment, the method comprises providing a previously formed water-soluble substrate 10 and applying a first coating layer 21 to at least one of the surfaces 12, 14 of the previously formed water-soluble substrate 10.

The first coating layer 21 can be applied to the previously formed water-soluble substrate 10 in a number of different manners. In one non-limiting embodiment, the coating layer is applied to at least one of the surfaces 12, 14 of the previously formed water-soluble substrate 10 in the form of particles or a powder. Preferably, the particles or powder are applied to the water-soluble substrate 10 via a jet, or electro-statically. Due to the high speed of the jet, some of the powder is embedded into the substrate, thereby reducing, or even eliminating the need for using a binder. Also when the particles or powder are electro-statically applied, a binder is generally not needed. Nevertheless, a binder may be used. The binder may first be applied to the water-soluble substrate 10, before the powder or particles are applied. Or, alternatively, the binder may be mixed with the powder or particles, and then the mixture is added to the water-soluble substrate 10.

In another non-limiting embodiment of the method, the first coating layer 21 is provided in the form of a solution that is applied onto at least one of the surfaces 12, 14 of the water-soluble substrate 10, and is allowed to dry, or undergoes a drying process. The solution can be applied on the substrate by means of any coating process, including spray, knife, rod, kiss, slot, painting, printing and mixtures thereof. Printing is preferred for use herein. Printing is a well established and economic process. Printing is usually done with inks and dyes and used to impart patterns and colors to substrates but in the case of the invention printing is used to deposit the first coating layer onto a water-soluble substrate. Any kind of printing method can be used, including rotogravure, lithography, flexography, porous and screen printing, inkjet printing, letterpress, tampography and combinations thereof.

These embodiments may also comprise a step of wetting at least a portion of at least one of the surfaces 12, 14 of the water-soluble substrate 10 prior to applying the first coating layer 21 to the previously formed water-soluble substrate 10. The wetting of at least one of the surfaces 12, 14 of the water-soluble substrate 10 may be used to at least partially dissolve or solubilize an outer portion of the surface 12, 14 of the substrate 10 (that is, part of the way into the thickness of the substrate). The water-soluble substrate 10 may be at least partially solubilized to any suitable depth in order to partially embed the coating into the substrate. Suitable depths include, but are not limited to: from about 1% to about 40% or about 45%, from about 1% to about 30%, from about 1% to about 20%, from about 1% to about 15%, and alternatively, from about 1% to about 10% of the overall substrate thickness 16. The coating layer 21 is then applied to the partially dissolved portion of at least one of the surfaces 12, 14 of the substrate 10. This allows the coating layer to be partially embedded into an outer portion of the surface 12, 14 of the substrate 10, and to become a more permanent part of the substrate 10. The wetted surface 12, 14 of the substrate 10 with the coating layer partially embedded into the same is then permitted to dry. Such an embodiment of the method may also comprise a step of removing at least some of any loose or excess coating material remaining on the surface of the water-soluble substrate 10 after it has dried, such as by wiping or dusting the surface of the substrate 10.

In another embodiment, the first coating layer 21 can be added to the water-soluble substrate 10 after the substrate 10 is made into a product. For example, if the water-soluble substrate 10 is used to form a water-soluble pouch that contains a composition, the first coating layer 21 can be added to the substrate 10 on at least a portion of the surface of the water-soluble pouch.

After the first coating layer 21 has been applied to the water-soluble substrate 10, a lubricant 23 is applied to said first coating layer 21. Lubricants can be applied as solid particulates via sprinkling, brushing via bristles, felt rolls, electrostatic deposition, impinging, jet, or as a liquid slurry and then drying out the solvent using printing and coating methods.

Then, a second coating layer 22 is applied according to any of the above methods (except for the method of wetting the water-soluble substrate).

Methods of Making a Water-Soluble Pouch

The water-soluble substrate 10 described herein can be formed into articles, including but not limited to those in which the water-soluble substrate 10 is used as a packaging material. Such articles include, but are not limited to water-soluble pouches, sachets, and other containers.

Water-soluble pouches and other such containers that incorporate the water-soluble substrate 10 described herein can be made in any suitable manner known in the art. The water-soluble substrate 10 can be provided with improved resistance to solubility either before or after forming the same into the final product. In either case, in certain embodiments it is desirable when making such articles, that the surface 12, 14 of the substrate 10 onto which the coating layers are applied, forms an outer surface of the product.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a substrate. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a substrate is placed in the die and open pouches are formed in these molds, which can then be filled, covered with another layer of substrate, and sealed. In the third process (formation of pouches in molds on the surface of a circular drum), a substrate is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the substrate can initially be molded or formed into the shape of an open pouch using thermoforming, vacuum-forming, or both. Thermoforming involves heating the molds and/or the substrate by applying heat in any known way such as contacting the molds with a heating element, or by blowing hot air or using heating lamps to heat the molds and/or the substrate. In the case of vacuum-forming, vacuum assistance is employed to help drive the substrate into the mold. In other embodiments, the two techniques can be combined to form pouches, for example, the substrate can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or substrate, such as a water-soluble substrate, over and onto the web of open pouches and then sealing the first substrate and second substrate together. The second material or substrate can comprise the water-soluble substrate 10 described herein. It may be desirable for the surface of the second substrate onto which the coating layers are applied, to be oriented so that it forms an outer surface of the pouch.

In such a process, the first and second substrates are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al.

Articles of Manufacture

Figure 3:
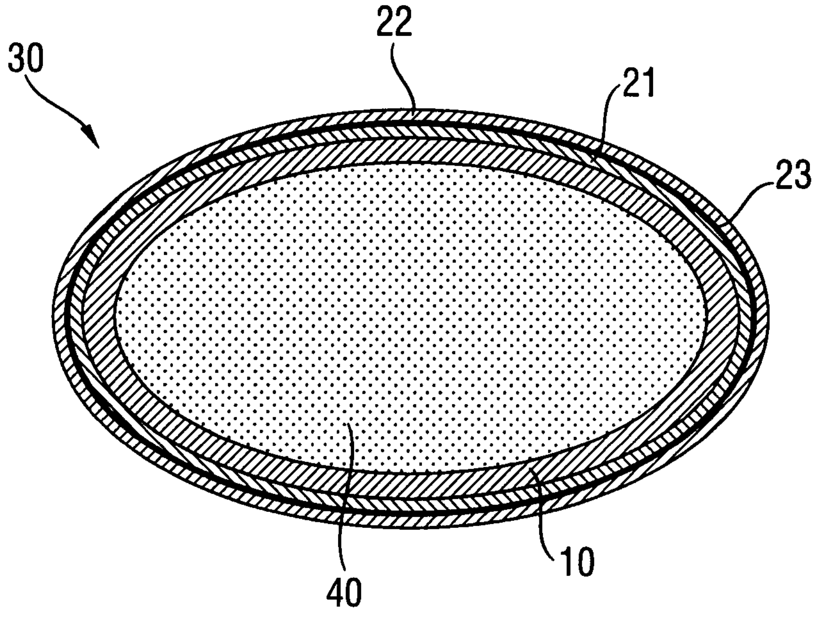
FIG. 3 shows a cross-section of an article comprising a water-soluble substrate according to the present invention.

As shown in FIG. 3, the present invention also includes articles comprising a product composition 40 and a water-soluble substrate 10 which may be formed into a container 30, such as a pouch, a sachet, a capsule, a bag, etc. to hold the product composition. The surface of the water-soluble substrate 10 which has the coating layers applied thereto, may be used to form an outside surface of the container 30. The water-soluble substrate 10 may form at least a portion of a container 30 that provides a unit dose of the product composition 40.

For simplicity, the articles of interest herein will be described in terms of water-soluble pouches, although it should be understood that discussion herein also applies to other types of containers.

The pouches 30 formed by the foregoing methods, can be of any form and shape which is suitable to hold the composition 40 contained therein, until it is desired to release the composition 40 from the water-soluble pouch 30, such as by immersion of the water-soluble pouch 30 in water. The pouches 30 can comprise one compartment, or two or more compartments (that is, the pouches can be multi-compartment pouches). In one embodiment, the water-soluble pouch 30 may have two or more compartments that are in a generally superposed relationship and the pouch 30 comprises upper and lower generally opposing outer walls, skirt-like side walls, forming the sides of the pouch 30, and one or more internal partitioning walls, separating different compartments from one another. If the composition 40 contained in the pouches 30 comprises different forms or components, the different components of the composition 40 may be contained in different compartments of the water-soluble pouch 30 and may be separated from one another by a barrier of water-soluble material.

The pouches or other containers 30 may contain a unit dose of one or more compositions 40 for use as/in laundry detergent compositions, automatic dishwashing detergent compositions, hard surface cleaners, stain removers, fabric enhancers and/or fabric softeners, food and beverage and new product forms where contact with small amounts of water could create premature pouch dissolution, unwanted pouch leakage and/or undesirable pouch-to-pouch stickiness. The composition 40 in the pouches 30 can be in any suitable form including, but not limited to: liquids, liquigels, gels, pastes, creams, solids, granules, powders, etc. The different compartments of multi-compartment pouches 30 may be used to separate incompatible ingredients. For example, it may be desirable to separate bleaches and enzymes into separate compartments. Other forms of multi-compartment embodiments may include a powder-containing compartment in combination with a liquid-containing compartment. Additional examples of multiple compartment water-soluble pouches are disclosed in U.S. Pat. No. 6,670,314 B2, Smith, et al.

The water-soluble pouches 30 may be dropped into any suitable aqueous solution (such as hot or cold water), whereupon water-soluble substrate material 10 forming the water-soluble pouches 30 dissolves to release the contents of the pouches.

The water-soluble substrate 10 described herein can also be used for coating products and other articles. Non-limiting examples of such a product are laundry detergent tablets or automatic dishwashing detergent tablets. Other examples include coating products in the food and beverage category where contact with small amounts of water could create premature dissolution, unwanted leakage and/or undesirable stickiness.

EXAMPLE

A first layer of a coating coded SOP 00090, supplied by ANI Printing Inks Group, is printed onto a standard polyvinyl alcohol M8630 water-soluble film supplied by Monosol, and is allowed to dry. Then, talc is brushed onto said first layer. A second layer of the same coating is then printed onto the first layer. The coated substrate shows improved resistance against accidental water-contact in a non-stretched as well as a stretched state, over uncoated substrates.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble substrate comprising a first surface and a second surface opposite to said first surface, said substrate having at least two coating layers applied to at least one of said first and second surfaces, wherein the at least two coating layers comprise a first coating layer closest to the water-soluble substrate and a second coating layer, wherein the first coating layer having a lower water-solubility than said second coating layer, wherein the at least two coating layers combined cover at least 95% of said first or second surface, and wherein a lubricant is applied between the at least two coating layers.

2. The water-soluble substrate according to claim 1, wherein said lubricant is selected from the group consisting of talc, polytetrafluoroethylene, silicone, cornstarch, wax, oil, polyolefin and combination thereof.

3. The water-soluble substrate according to claim 1, wherein the at least two coating layers comprises a disintegrant.

4. An article comprising the water-soluble substrate according to claim 1, wherein said at least two coating layers forms an outside surface of said article.

5. The article according to claim 4 wherein said article forms at least a portion of a container holding a product composition.

6. The water-soluble substrate according to claim 1, wherein the at least two coating layers are all water soluble.

7. The water-soluble substrate according to claim 1, wherein one or more of the at least two coating layers comprise a flexible material.

8. A coated substrate comprising:

a. a water-soluble substrate comprising a first surface and a second surface opposite to said first surface;

b. a first coating layer applied to at least one of said first and second surfaces;

c. a lubricant layer applied to said first coating layer opposite said one of first and second surfaces; and d. a second coating layer applied to said lubricant layer opposite said first coating layer;

e. wherein:

i. said first coating layer has a lower water-solubility than said second coating layer; and ii. said first and second coating layers combined cover at least 95% of said first or second surface.

* * * * *